Figure 1:
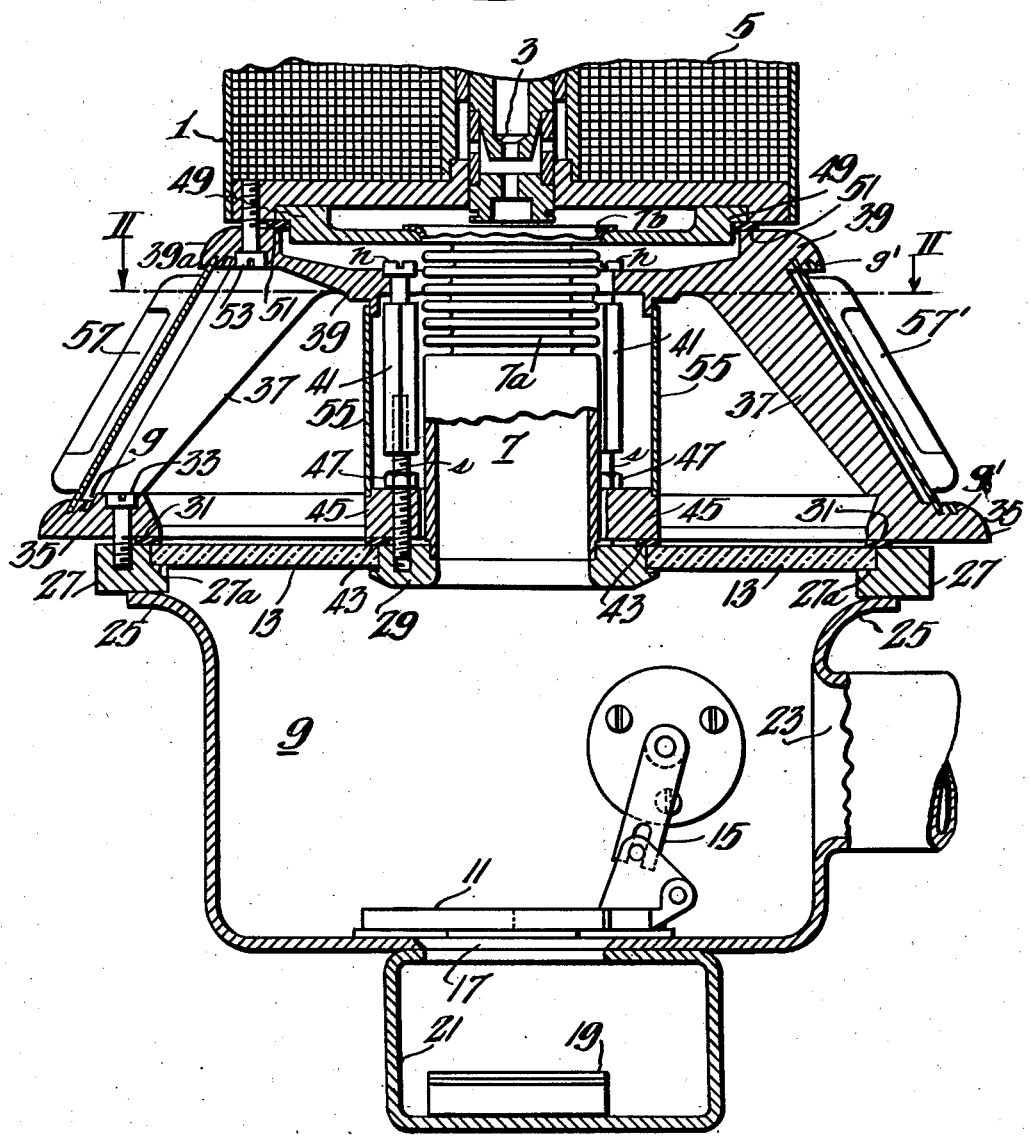

Aug. 29, 1944.   C. J. YOUNG   2,356,963
ELECTRON MICROSCOPE VIEWING CHAMBER
Filed Aug. 29, 1942   2 Sheets-Sheet 1

Inventor
Charles J. Young
By
Attorney

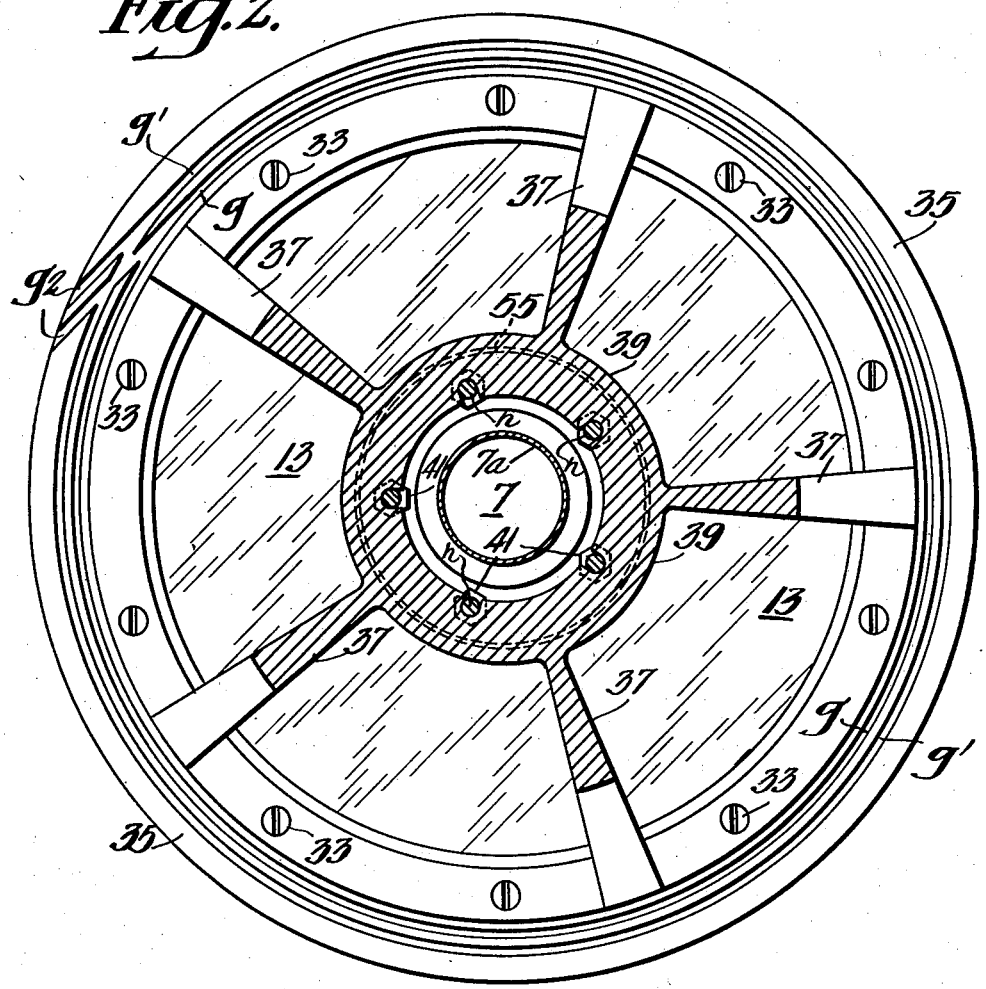

Patented Aug. 29, 1944

2,356,963

UNITED STATES PATENT OFFICE 2,356,963

ELECTRON MICROSCOPE VIEWING CHAMBER

Charles J. Young, Ardmore, Pa., assignor to Radio Corporation of America, a corporation of Delaware Application August 29, 1942, Serial No. 456,597

4 Claims. (Cl. 250—49.5)

This invention relates to electron-microscopes and particularly to improvements in the viewing chambers thereof.

It is conventional to provide the viewing chamber of an electron microscope with a number of circumferentially spaced windows so that several observers may simultaneously inspect the fluorescent screen or other target upon which the electron image of the specimen impinges. In such installations the number of observers that can view the screen at one time is of course limited to the number of window frames which can be provided in the limited wall space available. It is of course apparent that the window area could be greatly increased simply by constructing the cylindrical side wall of the viewing chamber entirely of glass or other transparent material. This however would be objectionable principally because of the optical distortion incident to looking through a glass cylinder which, usually, contains striations and other flaws.

Accordingly, the principal object of the present invention is to provide an improved viewing chamber for electron microscopes and one which obviates the foregoing and other less apparent objections to present day viewing chambers.

The foregoing and other objects are achieved, in accordance with the invention, by constructing the viewing chamber in the form of an evacuable binnacle having a preferably circular transparent cover or top plate through which the fluorescent screen or other electron target may be viewed. This chamber is mounted in spaced relation with respect to the main or lens compartment of the microscope and is connected thereto by a conduit through which the electrons pass in their journey to the target. The transparent cover through which the target is viewed is preferably mounted in a plane normal to the axis of the beam and of the conduit through which the electrons pass. The said conduit occupies but a limited space surrounding the center of the cover so that an unobstructed and undistorted view of the target is presented to an observer positioned at any point around the microscope. A removable, continuously adjustable shutter is provided to close the chamber to external light when a picture is to be taken by exposing a photographic plate, in a lower chamber, to the beam of electrons. This shutter may also serve as a convenient adjustable shade to prevent extraneous reflections on the transparent cover during direct observation.

Certain preferred details of construction together with additional objects and advantages will be apparent and the invention itself will be best understood by reference to the following specification and to the accompanying drawings, wherein:

Figure 1 is a longitudinal sectional view of a portion of an electron microscope showing an improved viewing chamber constructed in accordance with the invention and Figure 2 is a plan view of the viewing chamber taken on the line 2—2 of Fig. 1.

In the drawings: 1 designates a cylindrical casing surrounding the main chamber of an electron-microscope and which will be understood to contain a source of electrons (not shown) and an electron-lens system here exemplified by a plurality of axially aligned apertured lens elements 3 and a focusing coil 5 which surrounds the said lens elements. The electron beam formed in the main chamber 1 is directed by the lens system 3, 5 through a conduit 7 into a separate viewing chamber 9 where it impinges a fluorescent screen 11 which is here shown positioned in a plane normal to the axis of the said beam. As will hereinafter more fully appear the viewing chamber 9 is provided with a single inspection window in the form of a transparent top plate 13 which preferably extends a full 360° around the axis of the microscope. In the instant case the fluorescent screen or target 11 is provided with an externally actuated control mechanism 15 for moving it out of the path of the beam, whereupon the beam extends through an aperture 17 in the bottom of the viewing chamber and impinges a photographic film or plate 19 which is suitably mounted in an auxiliary chamber 21. The vacuum necessary to permit the passage of the electron beam to the alternate targets 11 and 19 is established through a port 23 in the viewing chamber 9.

When, as in the illustrated embodiment of the invention, the microscope is mounted in an upright position, the side and bottom walls of the viewing chamber 9 and of the auxiliary chamber 21 are preferably constituted of metal and are of a rugged construction sufficiently strong to support the entire weight of the microscope. In the instant case the side wall of the viewing chamber 9 is bowed outwardly at its upper extremity as indicated at 25 and has a circular metal window frame 27 hermetically sealed thereto as by brazing or welding. This frame 27 is provided with an inner step 27a upon which the glass plate or window 13 is seated. This transparent plate 13 is in the form of an annulus and is further supported about its inner peripheral edge upon metal ring 29 which forms an integral extension on the lower end of the metal conduit 7 through which the electrons pass in their journey to the screen 11. The outer periphery of the transparent plate 13 is sealed on its top side by a gasket 31 which is held under pressure by screws 33 which extend through a clamping ring 35 into the frame 27 on the top edge of the viewing chamber or binnacle 9.

As shown in both Figs. 1 and 2 the clamping ring 35 forms the base of a cast metal "spider" having a number (in this case five—see Fig. 2) of upwardly and inwardly extending radially arranged legs 37 which terminate at their upper extremities in a dished body portion 39 having a circumferential shoulder 39a which serves as a support for the main chamber or casing 1 of the microscope. Since (as more clearly shown in Fig. 2) the radially extending legs 37 of this spider-like support are quite narrow and are widely spaced, it is apparent that an observer positioned at any point around the 360° circumference of the transparent top plate 13 will have an unobstructed view, with both eyes, of the entire screen or target 11. This construction thus greatly reduces eye strain as compared with prior art arrangements in which the observer is either limited to the use of one eye or is obliged to hold his head constantly in register with a small window, or pair of windows.

The use of an annular glass plate as the viewing window gives rise to two structural problems, both of which are solved by the construction of the present invention. The first problem was that of providing an adequate support for the annulus about its center so that it would withstand the several hundred pounds of atmospheric pressure which obtains on its top surface when the viewing chamber is evacuated. The second problem was to provide the support in such a way that the annular glass plate was not subjected to "dishing" strains, as between its inner and outer peripheries, during its assembly. These problems were solved, in accordance with the invention, by constructing the electron conduit 7 in whole or in part of a flexible bellows or Sylphon 7a and by the use of a number of turn-buckles 41 as adjustable supports for preventing downward deflection of the window when the microscope is evacuated.

The turnbuckles 41 here illustrated comprise a sleeve having an integral shouldered head h at its upper end and a lower internally threaded portion which receives the upper end of a screw s whose lower end is anchored in the flange or ring 29 on the lower end of the conduit 7. These screws s extend through a gasket 43 (which covers the crack between the inner periphery of the glass annulus 13 and the supporting ring 29) and through a clamping ring 45, and are provided each with a nut 47 for applying the necessary clamping force to the said gasket. During this clamping operation there is no rigid connection between the inner rings 29 and 45 and the outer rings 27 and 35, hence the glass is not subject to strain. Subsequent to this clamping operation the sleeves of the turnbuckles are screwed onto their screws s; their shouldered heads h hanging loosely while in the upper section 39 of the cast spider.

The necessary vacuum tight seal between the main chamber 1 and the viewing chamber 9 is maintained by soldering the outwardly turned upper end 7b of the Sylphon 7a to a removable supporting ring 49 which is provided for the purpose on the lower end of the main chamber 1. This ring 49 is in turn supported upon a gasket 51 on the shoulder 39a and is maintained in position by the screws 53 which secure the main chamber 1 to its support. During this clamping operation the flexibility of the conduit section 7a prevents the introduction of any strains in the glass annulus 13. At this point in the assembly the central supporting ring 29 is not rigidly supported by the turnbuckles 41 and, if the microscope were to be evacuated to the required degree at this time, the great pressure on the glass would crack it. This, however, is prevented by screwing the sleeves of the turnbuckles 41 down on the screws s so they assume their function of supporting the annulus 13 about its center.

The conduit 7 and the turnbuckles 41 are shown enclosed within a removable mask or sleeve 55 which is preferably provided with a dull finish on its exposed surface to prevent light from being reflected therefrom.

It will be observed upon inspection of Fig. 1 that the exposed marginal edges on the upper surface of the base 35 and on the lower surface of the shoulder 39a are each provided with a pair of circumferential grooves $g$, $g'$. These grooves comprise tracks for a pair of semi-circular inwardly inclined shutters 57, 57' which are used as a mask to prevent light from entering the photographic chamber through the aperture 17, and as a shade to prevent light from impinging an unused portion of the inspection window 13. The said shutters also serve as a dust cap for the said window when the microscope is not in use. These shutters 57 comprise more or less flexible metal bands and are readily removed from the microscope by movement along the side-tracks $g^2$ shown in Fig. 2.

Referring still to Fig. 2, it will be observed that the casting or spider 37—39 is designed on a pentagonal basis. This preferred arrangement provides three amply large viewing positions at the "front" and "sides" of the microscope and leaves two sections at the "rear." These "rear" sections, when unused, provide enough space to accommodate the two shutters 57, 57' which, in this case, should be a little over one and a half sections wide. Other divisions of the circumference do not provide such a highly practical arrangement.

From the foregoing, it is apparent that the present invention provides an improved viewing chamber for electron microscopes and one which obviates the disadvantages inherent in analogous viewing chambers of the prior art.

What is claimed is:

1. A viewing chamber for an electron-microscope, said chamber comprising an evacuable binnacle containing an image target and having a transparent cover through which said target may be viewed, adjustable means for supporting said cover in a plane substantially parallel to said target, and a flexible conduit communicating with the interior of said binnacle through said cover and through which electrons pass in their journey to said target.

2. The invention as set forth in claim 1 and wherein said flexible conduit and said adjustable support embrace a limited space surrounding the center of said transparent cover.

3. An electron microscope comprising a main chamber and a viewing chamber mounted in spaced relation along a common axis and connected by a relatively narrow flexible conduit surrounding said axis, said viewing chamber having a transparent cover in the form of an annulus surrounding said conduit whereby the interior of said viewing chamber is visible to an observer looking through said transparent cover from any point surrounding the space between said main chamber and said viewing chamber and a plurality of adjustable supports for said transparent cover mounted in spaced relation about said flexible conduit adjacent to the inner periphery of said annulus.

4. The invention as set forth in claim 3 and wherein said viewing chamber comprises the base of said microscope and said main chamber is supported thereabove by means of an openwork structure which presents a negligible barrier to the observation of the interior of said viewing chamber through its said transparent cover.

CHARLES J. YOUNG.